(12) United States Patent
Iwamoto et al.

(10) Patent No.: US 10,628,107 B2
(45) Date of Patent: Apr. 21, 2020

(54) SADDLE TYPE VEHICLE

(71) Applicants: KAWASAKI JUKOGYO KABUSHIKI KAISHA, Kobe-shi (JP); Continental Automotive GmbH, Hannover (DE)

(72) Inventors: Taro Iwamoto, Kakogawa (JP); Hiroyuki Watanabe, Kobe (JP); Jun Tominaga, Himeji (JP); Masanori Kinuhata, Kobe (JP); Dirk Braas, Hannover (DE)

(73) Assignees: Kawasaki Jukogyo Kabushiki Kaisha, Kobe-shi (JP); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/584,842

(22) Filed: May 2, 2017

(65) Prior Publication Data

US 2018/0215435 A1   Aug. 2, 2018

(30) Foreign Application Priority Data

Feb. 1, 2017   (JP) .................................. 2017-017088

(51) Int. Cl.
*B62K 11/14*   (2006.01)
*G06F 3/14*   (2006.01)
(Continued)

(52) U.S. Cl.
CPC ............ *G06F 3/1423* (2013.01); *B60K 35/00* (2013.01); *B60K 37/02* (2013.01); *B60K 37/04* (2013.01);
(Continued)

(58) Field of Classification Search
CPC ........ B62K 11/14; B60K 35/00; B60K 37/02; B60K 37/04; B62J 35/00; B62J 99/00
(Continued)

(56) References Cited

U.S. PATENT DOCUMENTS

| 9,233,609 B2* | 1/2016 | Nagara | .................. B60K 37/02 |
| 2003/0032327 A1* | 2/2003 | LaBonte | ................ B62K 11/14 439/527 |

(Continued)

FOREIGN PATENT DOCUMENTS

| JP | 1996133152 | 5/1996 |
| JP | 2007269042 | 10/2007 |

(Continued)

*Primary Examiner* — Jacob D Knutson
(74) *Attorney, Agent, or Firm* — Fay Kaplun & Marcin, LLP

(57) ABSTRACT

A motorcycle includes an analog display unit, a liquid crystal display unit, a meter circuit board, a communication unit, a housing, and a meter harness. The analog display unit has a dial plate and a pointer. The liquid crystal display unit is a display for displaying vehicle information. The meter circuit board electronically controls contents displayed on the liquid crystal display unit. The communication unit performs the wireless communication with an external communication terminal. The meter circuit board and the communication unit are disposed within the housing. The meter harness supplies the power with at least the analog display unit, the liquid crystal display unit, the meter circuit board, and the communication unit, and they have a common power conduction path at the outside of the housing.

14 Claims, 8 Drawing Sheets

(51) Int. Cl.
 G06F 3/147 (2006.01)
 G09G 3/36 (2006.01)
 B60K 35/00 (2006.01)
 B60K 37/02 (2006.01)
 B60K 37/04 (2006.01)
 B62J 45/00 (2020.01)
 B62J 45/20 (2020.01)
 B62J 50/20 (2020.01)

(52) U.S. Cl.
 CPC ............... *G06F 3/147* (2013.01); *G09G 3/36* (2013.01); *B60K 2370/154* (2019.05); *B60K 2370/52* (2019.05); *B60K 2370/566* (2019.05); *B60K 2370/573* (2019.05); *B60K 2370/589* (2019.05); *B60K 2370/5911* (2019.05); *B60K 2370/782* (2019.05); *B60K 2370/81* (2019.05); *B60Y 2200/12* (2013.01); *B62J 45/00* (2020.02); *B62J 45/20* (2020.02); *B62J 50/20* (2020.02); *G09G 2330/00* (2013.01); *G09G 2370/16* (2013.01); *G09G 2380/10* (2013.01)

(58) Field of Classification Search
 USPC ........................................................ 180/400
 See application file for complete search history.

(56) References Cited

U.S. PATENT DOCUMENTS

| | | | |
|---|---|---|---|
| 2008/0203698 A1* | 8/2008 | Suita | B62K 11/14 280/276 |
| 2009/0127884 A1* | 5/2009 | Takahashi | B62J 17/04 296/96 |
| 2012/0126966 A1* | 5/2012 | Drury | B60K 35/00 340/438 |
| 2013/0030604 A1 | 1/2013 | Ohshima et al. | |
| 2016/0046187 A1* | 2/2016 | Montero Montes de Oca | B60K 35/00 340/461 |
| 2016/0176467 A1* | 6/2016 | Ishii | B62J 17/02 180/219 |
| 2017/0075162 A1* | 3/2017 | Tsubokura | G02F 1/133308 |

FOREIGN PATENT DOCUMENTS

| | | | |
|---|---|---|---|
| JP | 2011111068 | | 6/2011 |
| JP | 2015152330 | | 8/2015 |
| JP | 2015152330 A | * | 8/2015 |
| TW | M437271 U1 | | 9/2012 |
| TW | M514411 U | | 12/2015 |

* cited by examiner

US 10,628,107 B2

SADDLE TYPE VEHICLE

TECHNICAL FIELD

The present invention mainly relates to a saddle type vehicle.

BACKGROUND

A saddle type vehicle including a vehicle meter device has been conventionally known. As shown in Patent Document 1 (Japanese Utility Model Registration No. 3085211), in the saddle type vehicle, the vehicle meter device is disposed so as to be exposed to the outside. A vehicle meter device shown in Patent Document 1 is configured to display a driving speed and the like by moving a pointer on a dial plate. A vehicle meter device shown in Patent Document 2 (Japanese Patent No. 4730880) is configured to display a driving speed and the like on a liquid crystal display.

In a saddle type vehicle, water such as rain may be gotten on a vehicle meter since it is exposed to the outside. Thus, waterproofness is required for the vehicle meter device of the saddle type vehicle. A power supply unit (such as electric wires) for supplying the power is connected to the vehicle meter device. Therefore, an area where the power supply unit is connected needs to be protected from water. However, Patent Documents 1 and 2 do not disclose a specific configuration of the vehicle meter device.

SUMMARY

The present invention relates to a saddle type vehicle including a vehicle meter device which easily protects an area where a power supply unit is connected from water.

In an aspect of the present invention, a saddle type vehicle is configured as follows. The saddle type vehicle includes an analog display unit, an electronic display unit, a display control unit, a communication unit, a housing, and a power supply unit. The analog display unit being exposed to the outside has a dial plate and a pointer. The electronic display unit being exposed to the outside has a display for indicating a vehicle information. The display control unit electronically controls contents displayed on the electronic display unit. The communication unit performs the wireless communication with an external communication terminal. The display control unit and the communication unit being disposed within the housing includes a part of the analog display unit and a part of the electronic display unit. The power supply unit supplies the power with at least the analog display unit, the electronic display unit, the display control unit, and the communication unit, and they have a common power conduction path at the outside of the housing.

Waterproofness is required for the vehicle meter device in which the housing is exposed to the outside. In this respect, in the present invention, a common power conductor supplies the power with four components of the analog display unit, the electronic display unit, the display control unit, and the communication unit, at at least the outside of the housing. This can easily protect four components from water, compared to a case when using different power conductors. In addition, a power conduction path at the outside of the housing can be simple.

In another aspect of the present invention, a saddle type vehicle is configured as follows. The saddle type vehicle includes an electronic display unit, a display control unit, a communication unit, a housing, and a power supply unit. The electronic display unit being exposed to the outside has a display for indicating a vehicle information and speed information, preferably as display of a dial and a pointer. The display control unit electronically controls contents displayed on the electronic display unit. The communication unit performs the wireless communication with an external communication terminal. The display control unit and the communication unit being disposed within the housing includes a part of the electronic display unit. The power supply unit supplies the power with at least the electronic display unit, the display control unit, and the communication unit, and they have a common power conduction path at the outside of the housing.

Waterproofness is required for the vehicle meter device in which the housing is exposed to the outside. In this respect, in the present invention, a common power conductor supplies the power with three components of the electronic display unit, the display control unit, and the communication unit, at at least the outside of the housing. This can easily protect three components from water, compared to a case when using different power conductors. In addition, a power conduction path at the outside of the housing can be simple.

According to the present invention, a saddle type vehicle including a vehicle meter device which can easily protect an area where a power supply unit is connected from water can be provided.

DETAILED DESCRIPTION

Figure 1:
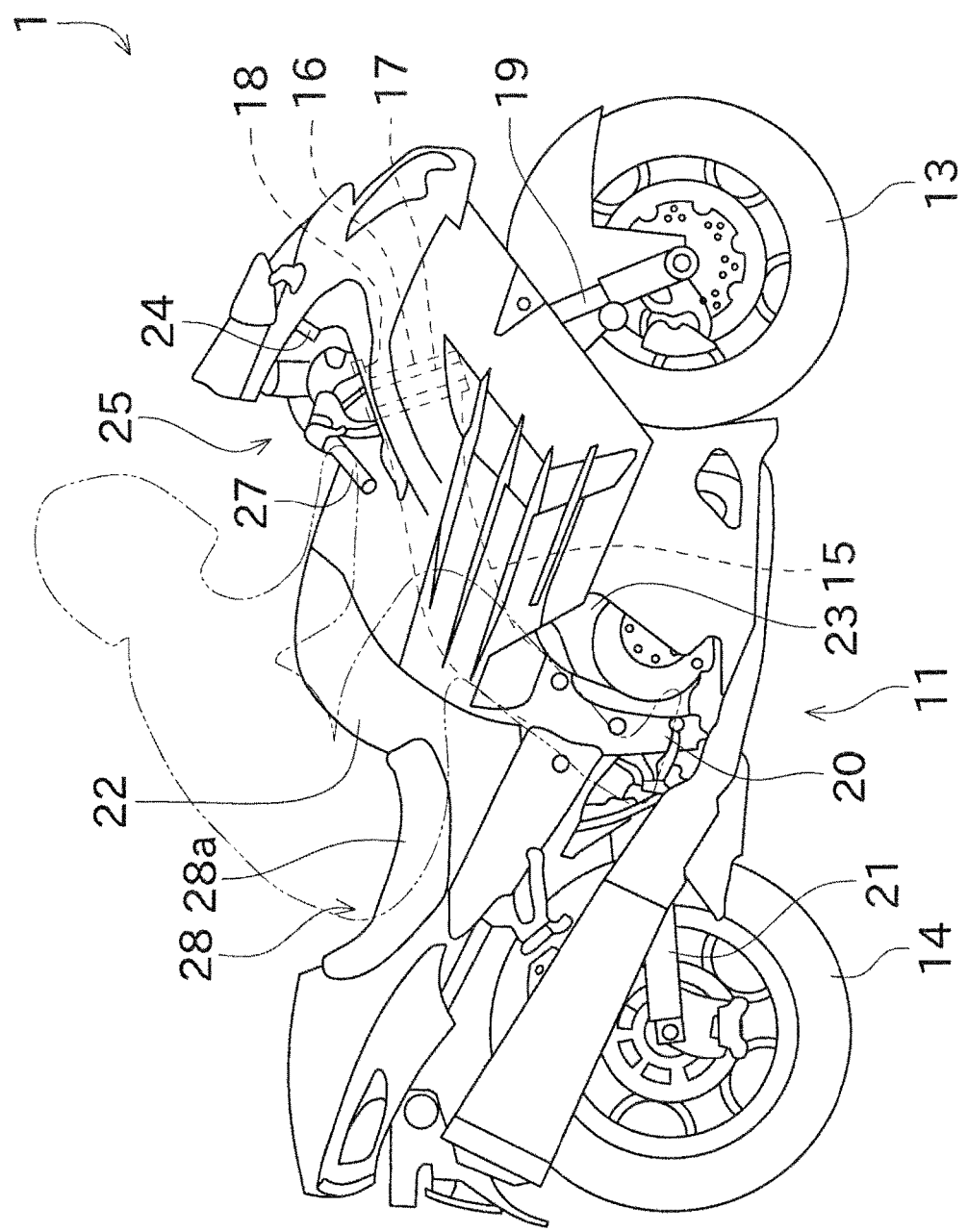
FIG. 1 shows a side view of a motorcycle according to one embodiment of the present invention.
Figure 2:
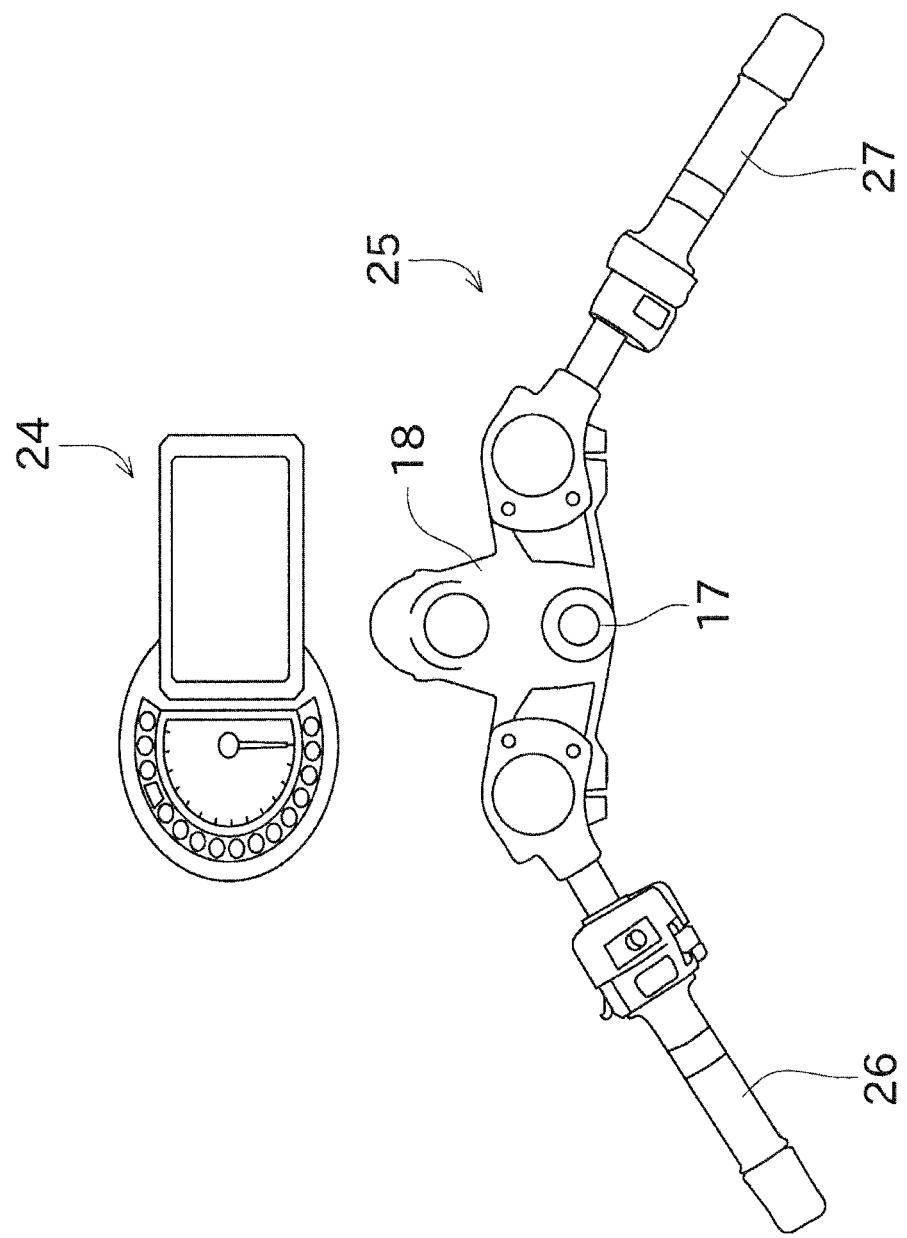
FIG. 2 shows a plan view of the motorcycle near a steering handle and a meter device.

An exemplary embodiment of the present invention will be described with reference to the drawings. Firstly, an overview of a motorcycle 1 will be described with reference to FIG. 1 and FIG. 2. FIG. 1 is a side view of the motorcycle 1. FIG. 2 is a plan view of the motorcycle 1 near a steering handle 25 and a meter device 24. In the following description, for the front-back direction and the left-right direction, a direction where the motorcycle 1 goes forward is defined as a front direction. An upper side and a lower side in the vertical direction are defined as the upper side and the lower side.

The motorcycle 1 as a saddle type vehicle shown in FIG. 1 includes a vehicle body 11, a front wheel 13, and a rear wheel 14.

The front wheel 13 and the rear wheel 14 are rotatably supported to the vehicle body 11. Specifically, a head pipe 16 is connected to a front end of a main frame 15 included in the vehicle body 11. In the head pipe 16, a front fork 19 is supported via a steering shaft 17, an upper bracket 18 and the like. The front wheel 13 is rotatably supported via the front fork 19.

A swing arm bracket 20 is integrally formed at a rear end of the main frame 15. A swing arm 21 is swingably supported in the swing arm bracket 20. The rear wheel 14 is rotatably supported via the swing arm 21.

A fuel tank 22 is arranged above the main frame 15. The fuel tank 22 stores a fuel that is supplied with an engine 23 arranged below the main frame 15. The engine 23 generates a driving force for rotating the rear wheel 14 of the motorcycle 1.

A meter device (a vehicle meter device) 24 is arranged in front of the fuel tank 22 and in front of the upper bracket 18. The meter device 24 is mounted via a meter bracket which is supported to the head pipe 16. The meter device 24 displays a vehicle speed, an engine speed and the like. The detailed structure and arrangement of the meter device 24 will be described later.

The steering handle 25 is arranged rearward of the meter device 24. The steering handle 25 is a component (operating tool) for the driver's steering. The steering handle 25 includes a left grip 26 and a right grip (throttle grip) 27. The driver adjusts an output of the engine 23 by performing rotational operation of the right grip 27 while steering the motorcycle 1 with holding the left grip 26 and the right grip 27. A plurality of switches for performing the various type of operations is provided within a vehicle width direction of the left grip 26 and the right grip 27.

A driver's seat 28 including a seat 28a for being sat by the driver is arranged rearward of the meter device 24. The seat 28a is a portion on which the driver puts his/her hip. Although the driver's seat 28 of this embodiment has no backrest, the driver's seat may include the seat and the backrest. The driver's seat 28 is arranged rearward of the fuel tank 22 (a part of the fuel tank 22 may be positioned below the driver's seat 28). The driver sits on the driver's seat 28 (the seat 28a) and steers the motorcycle 1 while holding the steering handle 25 and looking around and at the meter device 24. At this time, the driver makes his/her lower body to be stabilized by putting the fuel tank 22 between his/her knees and partly steers while moving the center of gravity in the left-right direction.

Next, a mechanical configuration and an electrical configuration of the meter device 24 will be described with reference to FIG. 3 and FIG. 4. In the meter device 24, seeing a display surface (the after-mentioned surface of an analog display unit 40, a liquid crystal display unit 52 and the like) from a direction vertical to the display surface is referred to as a front view.

Figure 3:
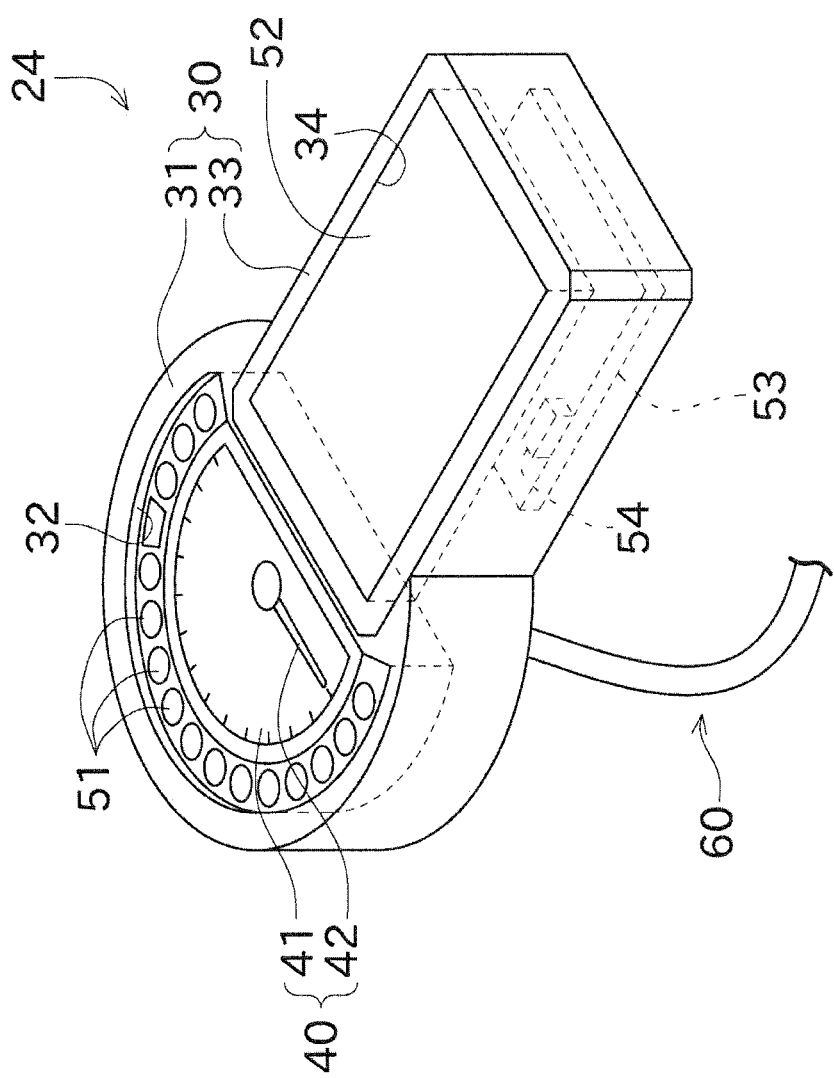
FIG. 3 shows a perspective view of the meter device.
Figure 4:
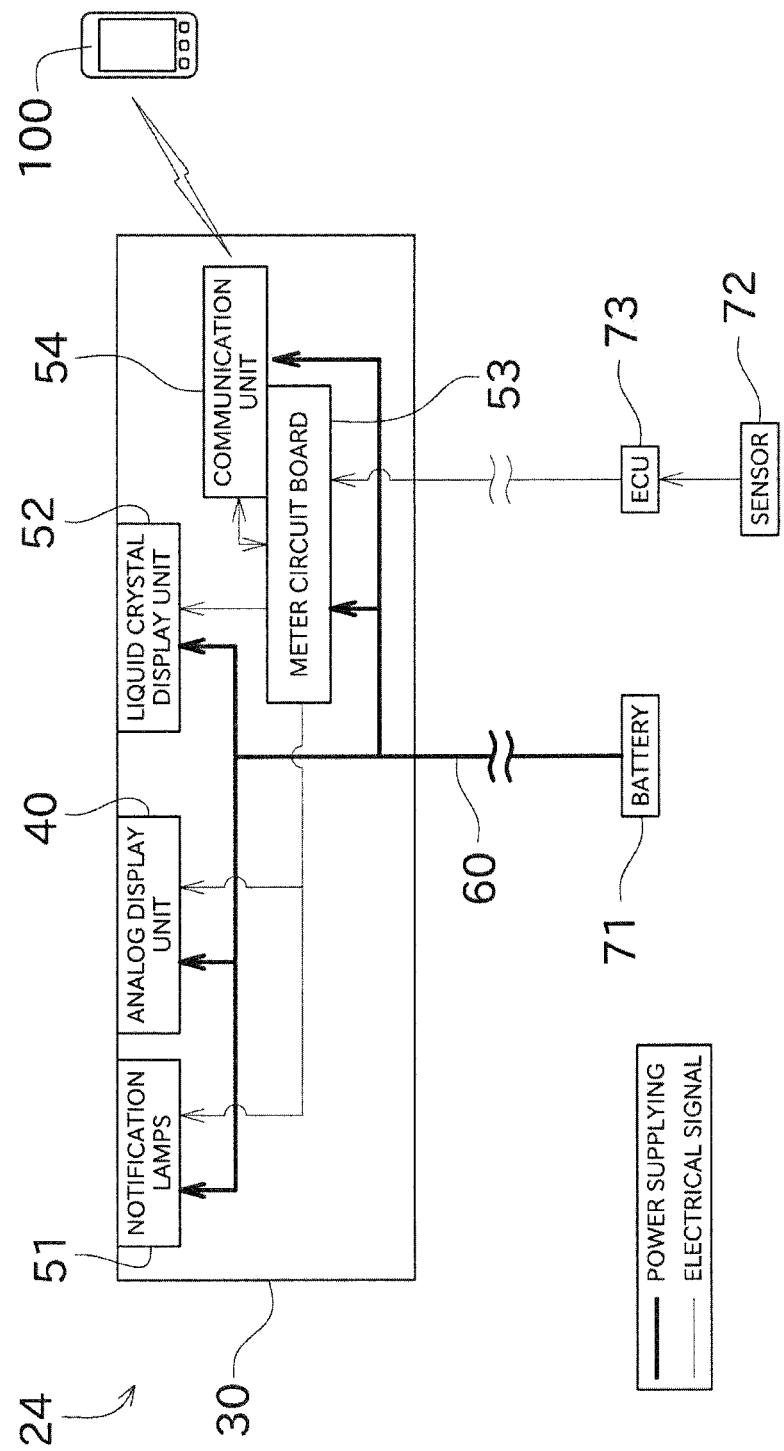
FIG. 4 shows a diagram illustrating a flow of a power supply and an electrical signal in the meter device.

As shown in FIG. 3, the meter device 24 includes a housing 30, the analog display unit 40, notification lamps 51, the liquid crystal display unit (electronic display unit) 52, a meter circuit board (display control unit) 53, a communication unit 54, and a meter harness (power supply unit) 60.

The housing 30 is a member for forming an outer surface of the meter device 24. The housing 30 is exposed to the outside of the motorcycle 1 so that the driver can visually recognize a notification displayed on the meter device 24. The meter device 24 has an internal space for accommodating each of members that configures the meter device 24. The housing 30 includes a circular section 31 and a rectangular section 33. The circular section 31 and the rectangular section 33 are integrally formed with each other.

The circular section 31 is a circular portion in the front view (to be specific, a circular portion partly missed, that is, a fan-shaped portion, and so forth). A circular opening 32 that opens in a circle in the front view is formed on a surface of the circular section 31. The analog display unit 40 and the notification lamps 51 are arranged in the circular opening 32. As such, the analog display unit 40 and the notification lamps 51 configures a part of the housing 30 (to be specific, a circular section in the front view).

The rectangular section 33 is a rectangular portion in the front view. As described above, the circular section 31 has a partly missed circular shape. The rectangular section 33 is formed so as to overlap this missing part. A rectangular opening 34 that opens in a rectangle is formed on a surface of the rectangular section 33. The liquid crystal display unit 52 is arranged in the rectangular opening 34. As such, the liquid crystal display unit 52 configures a part of the housing 30 (to be specific, a rectangular section in the front view).

The analog display unit 40 is a portion that displays an engine speed with a mechanical configuration. Specifically, the analog display unit 40 includes a dial plate 41 and a pointer 42. The dial plate 41 is a circular plate-like member. A dial (not shown) that displays the engine speed is displayed on the dial plate 41. The pointer 42 is configured to rotate in accordance with the engine speed on the dial plate 41. The pointer 42 points the dial of the dial plate 41, and thereby the engine speed is displayed. The analog display unit 40 includes a transparent plate (such as an acrylic plate, not shown) that is arranged so as to cover the dial plate 41 and the pointer 42.

Each of the notification lamps 51 having a circular shape is arranged side by side in a circle at the outside of the dial plate 41. Each of the notification lamps 51 notifies various situations concerning the motorcycle 1. The contents notified by each of the notification lamps 51 include, for example, a situation that a turn signal is in operation, the voltage reduction of a battery 71, an irradiation state of a headlamp, the remaining amount of fuel, a situation that the temperature of cooling water is high, a neutral position of a transmission, and the like. Each of the notification lamps 51 includes an indication plate printed an icon in accordance with the notified contents, and a lamp for making the indication plate turn on. The lamp is arranged in the back of the indication plate (within the housing 30).

The liquid crystal display unit 52 includes a dot matrix electronic display device (such as a liquid crystal display, a plasma display, an organic EL display). The liquid crystal display unit 52 displays the vehicle information concerning the motorcycle 1 (to be specific, the driving speed, the mileage, the remaining amount of fuel and the like). The liquid crystal display unit 52 can display the information received from a communication terminal of the driver or the like (details will be described later). The liquid crystal display unit 52 is not limited to a dot matrix type display. A segment type display may be used for the liquid crystal display unit 52.

As described above, since the analog display unit 40, the notification lamps 51, and the liquid crystal display unit 52 are included in a part of the housing 30, they are exposed to the outside.

The meter circuit board 53 is arranged at the internal space of the housing 30. The meter circuit board 53 performs the various control concerning the meter device 24. For example, as shown in FIG. 4, the contents detected by any type of sensor 72 arranged in the motorcycle 1 are inputted to the meter circuit board 53 via an ECU 73. The sensor 72 may output the detection result directly to the meter circuit board 53. Based on the detection result of the sensor, the meter circuit board 53 enables the pointer 42 to be rotated by outputting the predetermined electrical signal to the analog display unit 40, the notification lamp 51 to be turned on by outputting the predetermined electrical signal, the liquid crystal display unit 52 to display an image data by transmitting the image data to the liquid crystal display unit 52, or the communication unit 54 to perform communication.

Although the communication unit 54 is arranged at the internal space of the housing 30, specifically, on the meter circuit board 53, the communication unit 54 may be arranged on another position other than the meter circuit board 53 as long as the communication unit 54 is arranged within the internal space of the housing 30. The communication unit 54 can perform the wireless communication with a communication terminal 100 of the driver or the like. To be specific, the communication unit 54 transmits the predetermined information (for example, the turbocharging pressure, the remaining amount of fuel, the mileage, information of the vehicle posture and the like) in the wireless communication, and receives the predetermined information from the communication terminal 100. The predetermined information received from the communication terminal 100 includes the setting change, the navigation information, and the information concerning the communication status of the communication terminal 100 (specifically, such as a mail reception state, a telephone call state, a state of applications pre-installed on the communication terminal 100 and the like). Since the motorcycle 1 and the driver or the like are positioned in a relatively close distance, in the communication between the motorcycle 1 and the communication terminal 100, the communication standard having the communication distance of 10 m or less, approximately 10 m, or 100 m or less (near field communication) can be used. Bluetooth (registered trademark) can be used as an example for the communication standard. It is assumed that the communication between the meter device 24 and the communication terminal 100 is performed outdoors. Therefore, it is preferable to use the communication standard which can perform the communication after the meter device 24 and the communication terminal 100 are registered each other and completed the authentication process.

The meter harness 60 supplies the power (power supply) for driving each of parts in the meter device 24. The meter harness 60 is connected to the battery 71 directly or via other electric wires or the like. The meter harness 60 includes a conductor for supplying the power with each of parts in the meter device 24. A power conduction path is common since the conductor has a single system at the outside of the housing 30. The meter circuit board 53 is configured to be partly exposed to the outside from the housing 30. A board side connector is arranged at this exposed portion. The meter harness 60 (to be specific, a harness side connector in an end portion of the meter harness 60) is connected to the board side connector. A protector (such as a cover for covering the connectors) for preventing the entry of water or the like is provided at a connecting position of the meter side connector and the harness side connector. The meter harness 60 branches into a plurality of systems within the housing 30, and supplies the power with the analog display unit 40, the notification lamps 51, the liquid crystal display unit 52, the meter circuit board 53, and the communication unit 54 individually. As such, the power conduction path is branched within the housing 30. The meter harness 60 may be configured to bundle a plurality of electrical wires. In this case, the plurality of electrical wires is bundled at the outside of the housing 30, and thereby the power conduction path is common. The plurality of electrical wires is branched within the housing 30, and thereby the power conduction path is branched.

In this embodiment, at the outside of the housing 30, the electrical wire for transmitting the electrical signal has the same path as that of the meter harness 60. In the same manner as the meter harness 60, the electrical wire for transmitting the electrical signal is connected to the meter circuit board 53.

Here, water such as rain may be gotten on the meter device 24 since the meter device 24 is exposed to the outside, which requires waterproofness. Therefore, if the harness is wired from the outside of the meter device 24 to the inside, as described above, the protector needs to be provided at the connecting position between the meter side connector and the harness side connector. In this respect, in this embodiment, the power conduction path is common at the outside of the housing 30. Accordingly, the number of the protectors for providing can be reduced, which can easily protect the connecting position from water. In addition, since the handleability of the meter harness 60 can be improved, the wiring operation can be easily performed. In particular, since the meter harness 60 is connected to the meter device 24 by using the connector, the connecting operation of the meter harness 60 can be easily performed. This can improve of the efficiency of the assembling operation.

Next, the relative positions of the meter device 24 relative to the position of each parts of the motorcycle 1 will be described with reference to FIG. 1 and FIG. 2. In the following description, the vertical positional relationship means the positional relationship when the motorcycle 1 is positioned on a horizontal plane. For the description that B is positioned above A, it means that a lower end of B is merely positioned above an upper end of A, and the front-back positional relationship and the horizontal positional relationship does not matter. The same applies to the positions other than above.

The communication unit 54 is included within the meter device 24 of this embodiment. The meter device 24 is configured to communicate with the communication terminal 100 of the driver. In general, since a metal is often used in the vehicle body 11 of the motorcycle 1, the vehicle body 11 is preferably not positioned between the communication terminal 100 and the communication unit 54 in order to obtain a good communication environment between the communication terminal 100 and the communication unit 54. A specific description will be described as follows.

As shown in FIG. 1, the meter device 24 is positioned above the seat 28a of the driver's seat 28. In general, the communication terminal 100 is normally positioned on or near the driver's upper body. Therefore, the meter device 24 is positioned above at least the seat 28a. This can be likely to obtain a good communication environment.

As shown in FIG. 1 and FIG. 2, the meter device 24 is positioned between the left grip 26 and the right grip 27 (positioned at a right side of the left grip 26 and positioned at a left side of the right grip 27). Furthermore, the meter device 24 is positioned forward of the left grip 26 and the right grip 27. Accordingly, the grip 26, the right grip 27, and the driver's arms are less likely to interrupt the communication. This can be likely to obtain a good communication environment. In this embodiment, although the meter device 24 is positioned forward of and between the left grip 26 and the right grip 27, only either one of positional relationships may be established.

As shown in FIG. 1 and FIG. 2, the meter device 24 is positioned forward of the upper bracket 18 and positioned above the upper bracket 18. Accordingly, the upper bracket 18 is less likely to interrupt the communication. This can be likely to obtain a good communication environment. In this embodiment, although the meter device 24 is positioned forward of and above the upper bracket 18, only either one of positional relationships may be established.

Furthermore, the fuel tank 22 is positioned rearward of the upper bracket 18. An upper end of the fuel tank is positioned above an upper end of the upper bracket 18. That is, since the position of the fuel tank 22 is relatively high, the fuel tank 22 is likely to interrupt the communication. In this respect, in this embodiment, the meter device 24 is positioned forward of and above the upper bracket 18 as described above. This can reduce a poor communication environment.

As described above, in this embodiment, the meter device 24 is positioned so as to obtain a good communication environment. In considering the communication environment, not the entire position of the meter device 24 but the position of the communication unit 54 is essentially important. Therefore, in the above-described example, even if the condition where the meter device 24 is replaced for the communication unit 54 is established, the same effect can be exerted.

Figure 5:
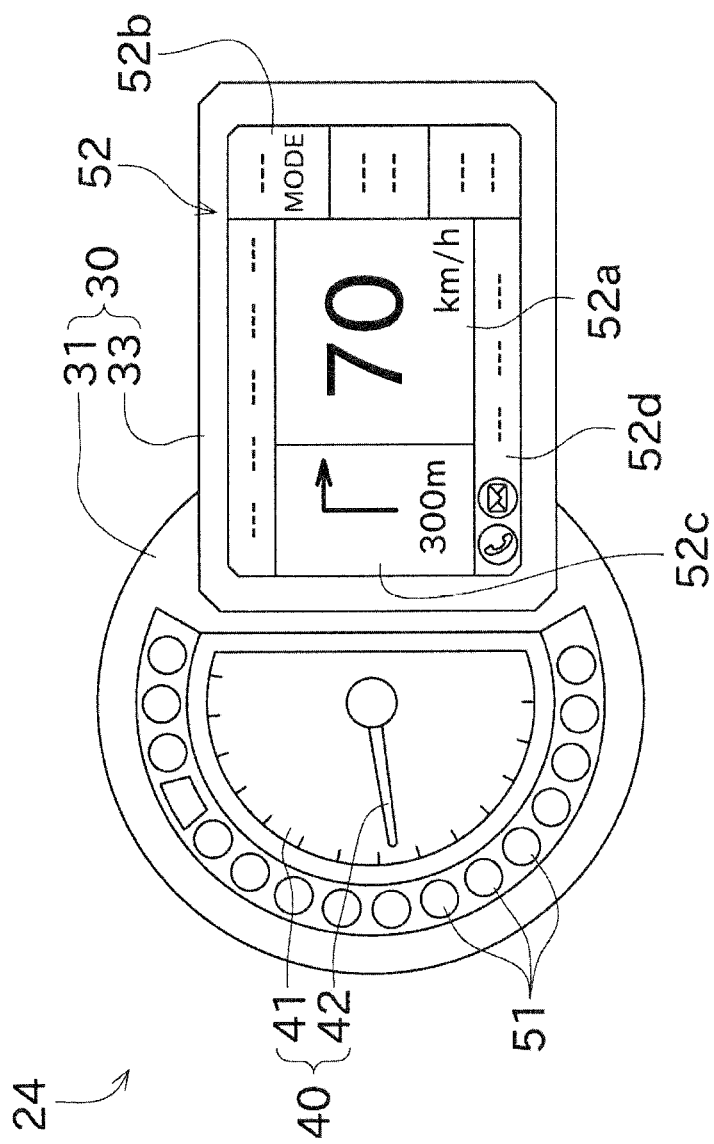
FIG. 5 shows a front elevational view of the meter device that illustrates the displayed contents during the driving.
Figure 6:
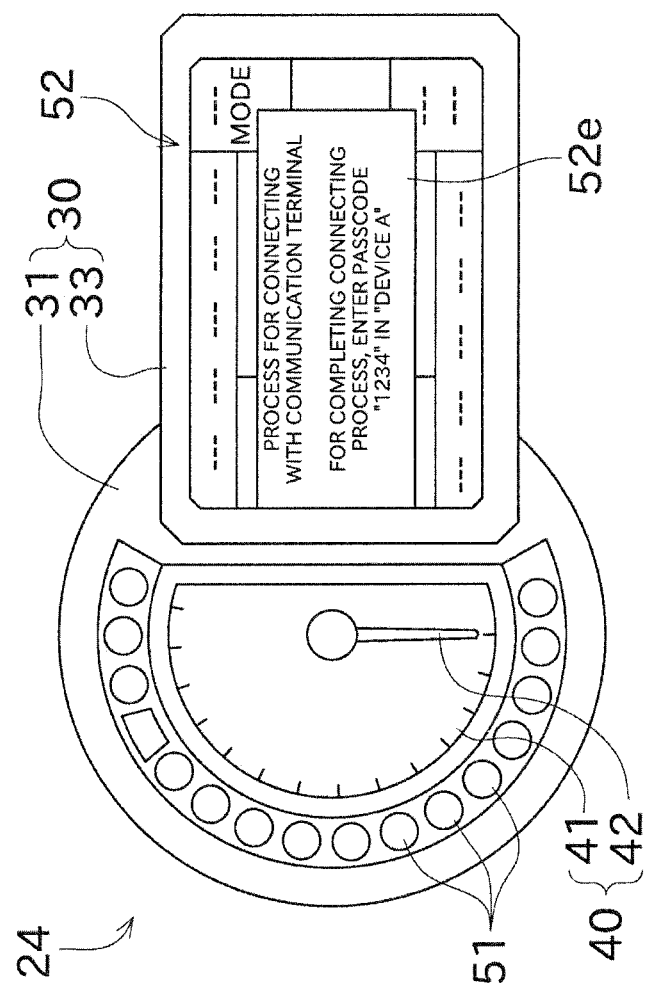
FIG. 6 shows a front elevational view of the meter device that illustrates the displayed contents when performing a connection processing with a communication terminal.

Next, details of the contents displayed on the liquid crystal display unit 52 will be described with reference to FIG. 5 and FIG. 6. FIG. 5 is a front elevational view of the meter device 24 that illustrates the displayed contents during the driving. FIG. 6 is a front elevational view of the meter device 24 that illustrates the displayed contents when processing the connection with the communication terminal 100.

As shown in FIG. 5, the liquid crystal display unit 52 includes a speed displaying area 52*a*, a mode displaying area 52*b*, a navigation information displaying area 52*c*, and a contact information displaying area 52*d*. The contents displayed on these areas are changed by the control of the meter circuit board 53.

The driving speed of the motorcycle 1 is displayed on the speed displaying area 52*a*. The driving mode of the motorcycle 1 is displayed on the mode displaying area 52*b*. The driving mode is for switching the characteristics of the motorcycle 1 depending on the driver's operation. The change of the driving mode leads to the change of the maximum power or the response to an accelerator position, for example. The driving mode can be switched by the driver's operation of the predetermined switch or the like. The driver transmits the predetermined signal to the meter device 24 via the communication terminal 100, which may enable to instruct the change of the driving mode. The driver may enable to instruct the change other than that of the driving mode (for example, the change of the information displayed on the meter device 24, the change of the layout of the meter device 24, the settings concerning the motorcycle 1, and the like) via the communication terminal 100.

The navigation information received from the communication terminal 100 is displayed on the navigation information displaying area 52*c*. The application having the navigation function is installed on the communication terminal 100. As described above, since the meter device 24 can communicate with the communication terminal 100, the following direction for turning and the distance to the turning place received from the communication terminal 100 are displayed. The navigation information displaying area 52*c* may further display other information (for example, a position of surrounding facilities, road signs to be paid attention, maps of the surrounding area, or the like).

The contact information including at least either one of the telephone call to the communication terminal 100 or the reception of message to the communication terminal 100 is displayed on the contact information displaying area 52*d*. When the contact information is received from the communication terminal 100, the meter device 24 displays the icon depending on the contact information on the contact information displaying area 52*d*. As such, the use of the icon enables the driver to instantly identify the type of the contact information. The message of the contact information is a concept including the message using the electronic mail, SMS (short message service), the application, or the like. The information that represents the sender of telephone calls or messages (the telephone number, the e-mail address or the like) may be also displayed on the contact information displaying area 52*d*.

As described above, it is preferable that the communication is available after the meter device 24 and the communication terminal 100 are registered each other and completed the authentication process. The liquid crystal display unit 52 can be used for the authentication process. To be specific, as shown in FIG. 5, a notification that the authentication process between the meter device 24 and the communication terminal 100 is executable can be displayed on an authentication relevant information displaying area 52*e* of the liquid crystal display unit 52. For example, if a passcode that is set in the meter device 24 needs to be inputted in the communication terminal 100, the passcode and the notification that the authentication process is completed by inputting the passcode can be displayed on the authentication relevant information displaying area 52*e*.

As such, in this embodiment, the meter device 24 displays the various information received from the communication terminal 100 on the liquid crystal display unit 52. The information displayed on the liquid crystal display unit 52 is not limited to the above-described example. The meter device 24 can receive the information to be displayed in the meter device 24 from the communication terminal 100 and display such information.

Next, the effects by which the meter device 24 includes both the analog display unit 40 and the liquid crystal display unit 52 will be described. The meter device 24 of this embodiment displays the information concerning the motorcycle 1 using both the analog display unit 40 and the liquid crystal display unit 52 with the housing 30. Here, although the analog display unit 40 has a high visibility, the displayed contents (types) of the information are likely to be limited since the displayed contents cannot be easily changed. On the other hand, although the liquid crystal display unit 52 may decrease the visibility, as described above, the liquid crystal display unit 52 can display the various contents (types) of information since the displayed contents can be easily changed by the control. The liquid crystal display unit 52 is superior to the analog display unit 40 in the number of contents of displayable information as well as the amount of displayable information.

As such, the analog display unit 40 and the liquid crystal display unit 52 have the conflicting advantages and disadvantages. Therefore, either the analog display unit 40 or the liquid crystal display unit 52 is used properly depending on the displayed vehicle information, which can achieve a preferred displaying. In this embodiment, the engine speed in which the driver of the motorcycle 1 needs to check frequently is displayed on the analog display unit 40. On the other hand, the information received from the communication terminal 100 and the information such as the driving mode to be frequently changed are displayed on the liquid crystal display unit 52.

Furthermore, in this embodiment, the notification lamps 51 are provided. The notification lamps 51 cannot display the various information since the notification lamps 51 are merely for indicating the presence or absence of events. However, the notification lamps 51 give the notification by lighting a portion where the light is normally turned off. This enables the driver to easily realize the notification of the notification lamps 51. Thus, in this embodiment, the warning information for notifying the abnormality or the like is notified using the notification lamps 51.

In the meter device 24 of this embodiment, the communication unit 54 is arranged within the housing 30. Therefore, a space for arranging the communication unit 54 is needed. In this respect, as this embodiment, in a case of using the common housing in the analog display unit 40 and the liquid crystal display unit 52, the internal space can be large. This can easily ensure the space for arranging the communication unit 54. Specifically, the analog display unit 40 includes the pointer 42 and a motor for driving the pointer 42. The liquid crystal display unit 52 includes a liquid crystal panel and a liquid crystal supporting section. The motor in the analog display unit 40 has the longer length in a width direction of the meter (the length in a direction vertical to a display surface, the length in a thickness direction) than the liquid crystal panel in the liquid crystal display unit 52. However, in the analog display unit 40 and the liquid crystal display unit 52, the position in the thickness direction of the display surface is substantially same such that the driver visually recognizes well. Therefore, the liquid crystal supporting section is configured to compensate for the difference in which the thickness of the motor in the analog display unit 40 is larger than the liquid crystal panel. Since a space is made in the area where the liquid crystal supporting section compensates for the difference, the internal space of the housing 30 is larger. This can easily ensure the space for arranging the communication unit 54.

As described above, the meter device 24 of this embodiment includes the analog display unit 40, the liquid crystal display unit 52, the meter circuit board 53, the communication unit 54, the housing 30, and the meter harness 60. The analog display unit 40 is exposed to the outside of the motorcycle 1. The analog display unit 40 has the dial plate 41 and the pointer 42. The liquid crystal display unit 52 is exposed to the outside of the motorcycle 1. The liquid crystal display unit 52 includes a display for displaying the vehicle information concerning the motorcycle 1. The meter circuit board 53 electronically controls the displayed contents on the liquid crystal display unit 52. The communication unit 54 performs the wireless communication with the external communication terminal 100. The meter circuit board 53 and the communication unit 54 are arranged within the housing 30. The housing 30 includes a part of the display unit 40 and a part of the liquid crystal display unit 52. The meter harness 60 supplies the power with at least the analog display unit 40, the liquid crystal display unit 52, the meter circuit board 53, and the communication unit 54, and they have a common power conduction path at the outside of the housing 30.

In this embodiment, the common meter harness 60 at at least the outside of the housing 30 supplies the power with four components of the analog display unit 40, the liquid crystal display unit 52, the meter circuit board 53, and the communication unit 54. This can easily protect four components from water, compared to a case when using different power conductors. In addition, since a power conduction path at the outside of the housing 30 can be simple, the efficiency of the assembling operation of the meter device 24 and the meter harness 60 can be improved.

The motorcycle 1 of this embodiment has the driver's seat 28 including the seat 28a for being sat by the driver. The meter device 24 in the vertical direction is positioned above the seat in the vertical direction.

Accordingly, the meter device 24 (in detail, the communication unit 54) is located at relatively high position, which can obtain a good communication environment between the communication unit 54 and the communication terminal 100. In particular, since the communication terminal 100 is often positioned on or near the driver's upper body, both the meter device 24 and the communication terminal 100 are likely to be located at a high position. This can specially obtain a good communication environment.

The motorcycle 1 of this embodiment has the steering handle 25 including two grips (the left grip 26 and the right grip 27) for the driver's operation. Either one of the positional relationships where the meter device 24 is positioned within two grips in the left-right direction or the meter device 24 is positioned forward of two grips in the front-back direction is established.

Accordingly, at least either one of two grips or the driver's arms is less likely to be positioned between the meter device 24 and the communication terminal 100, which can obtain a good communication environment.

The motorcycle 1 of this embodiment has the upper bracket 18 mounted via the steering shaft 17 which is rotatably supported to the main frame 15. Either one of the positional relationships where the meter device 24 in the front-back direction is positioned forward of the upper bracket 18 in the front-back direction or the meter device 24 in the vertical direction is positioned above the upper bracket 18 in the vertical direction is established.

Accordingly, the upper bracket 18 is less likely to be positioned between the meter device 24 and the communication terminal 100, which can obtain a good communication environment.

The motorcycle 1 of this embodiment includes the fuel tank 22 positioned rearward of the upper bracket 18. The upper end of the fuel tank 22 is positioned above the upper end of the upper bracket 18. The meter device 24 in the front-back direction is positioned forward of the upper bracket 18 in the front-back direction. The meter device 24 in the vertical direction is positioned above the upper bracket 18 in the vertical direction.

Accordingly, since the fuel tank 22 is positioned above the upper bracket 18, the fuel tank 22 is likely to interrupt the communication. However, the meter device 24 is positioned forward of and above the upper bracket 18, which can suppress a poor communication environment.

In the motorcycle 1 of this embodiment, the meter device 24 is mounted to a portion (the head pipe 16) where the steering handle 25 is rotatably supported.

Accordingly, since the position of the communication unit 54 relative to the vehicle body can be fixed, the direction for transmitting and receiving the wireless signal is constant regardless of the turning of the steering handle 25. This can prevent the change of the communication environment.

Figure 7:
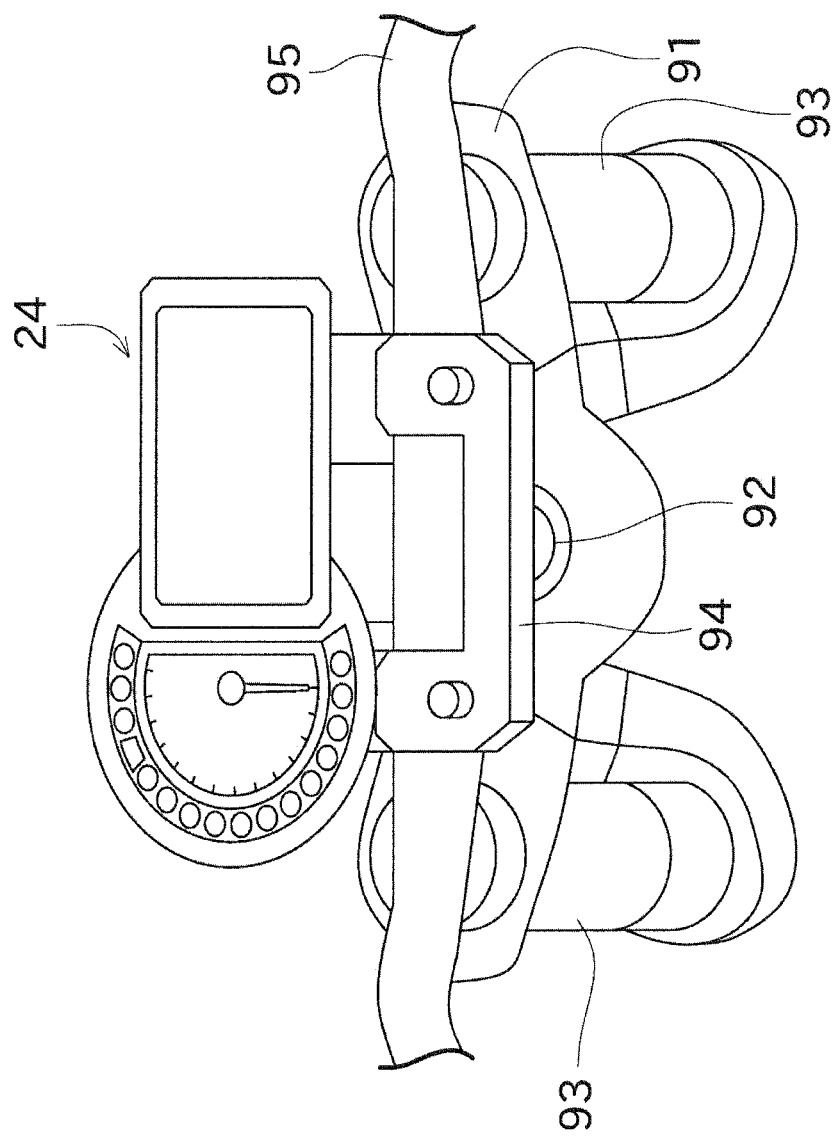
FIG. 7 shows a plan view of the steering handle and the meter device according to a modification of a motorcycle.

Next, a modification of the above-described embodiment will be described. FIG. 7 is a plan view of the steering handle and the meter device of the motorcycle according to the modification. In the description of the modification, since a configuration of the meter device 24 is common, the description is omitted.

In the modification, similarly to the above-described embodiment, a steering shaft 92 and a front fork 93 are mounted to the upper bracket 91. In the modification, a mounting bracket 94 is mounted to the upper bracket 91. A handle bar 95 is mounted to the mounting bracket 94. To be specific, the handle bar 95 is mounted to an upper position of the upper bracket 91 in the mounting bracket 94. The meter device 24 is mounted to a portion extending forward in the mounting bracket 94. In this modification, the meter device 24 is positioned forward of and above the upper bracket 91. This can obtain a good communication environment.

Although a preferred embodiment of the present invention has been described above, the above-described configuration may be modified, for example, as follows.

The above-described configuration of the meter device 24 is merely illustrative example, and the configuration different from the above-described configuration may be adoptable. For example, the notification lamps 51 may be omitted, and the warning information or the like may be displayed on the liquid crystal display unit 52. In the above-described embodiment, although the analog display unit 40 is arranged in the left side of the liquid crystal display unit 52, the analog display unit 40 may be arranged in the different direction such as right-side, upside, downside or the like of the liquid crystal display unit 52. The housing 30 of the meter device 24 may have a shape different from that of the above-described embodiment. For example, a shape other than a circular shape (for example, a rectangular shape) of the analog display unit 40 may be adoptable. Similarly, a circular shape (to be specific, a full circular shape or a circular shape having a missing part) of the liquid crystal display unit 52 may be adoptable. The housing 30 may be formed into one circler shape or one rectangular shape in the front view. The housing 30, in the front view, may have a shape in which two arc ends having a same central angle are arranged lengthwise and connected with each other in a straight line. The housing 30, in the front view, may have a shape having a portion where two circular shapes are arranged horizontally side by side at intervals and connected with each other. The housing 30, in the front view, may have a shape in which a circular shape and a rectangular shape are positioned so as to overlap with each other, the shape in which a part of the circular shape (for example, a part different from each other by 180 degrees such as an upper portion and a lower portion, a part opposing to each other) is positioned outward of the rectangular shape. The housing 30, in the front view, may be formed into a substantially rectangular shape and may have a curved shaped opposing sides so as to separate from each other as the opposing sides (for example, the sides far from and near the driver) are closer to the center in the horizontal direction.

Figure 8:
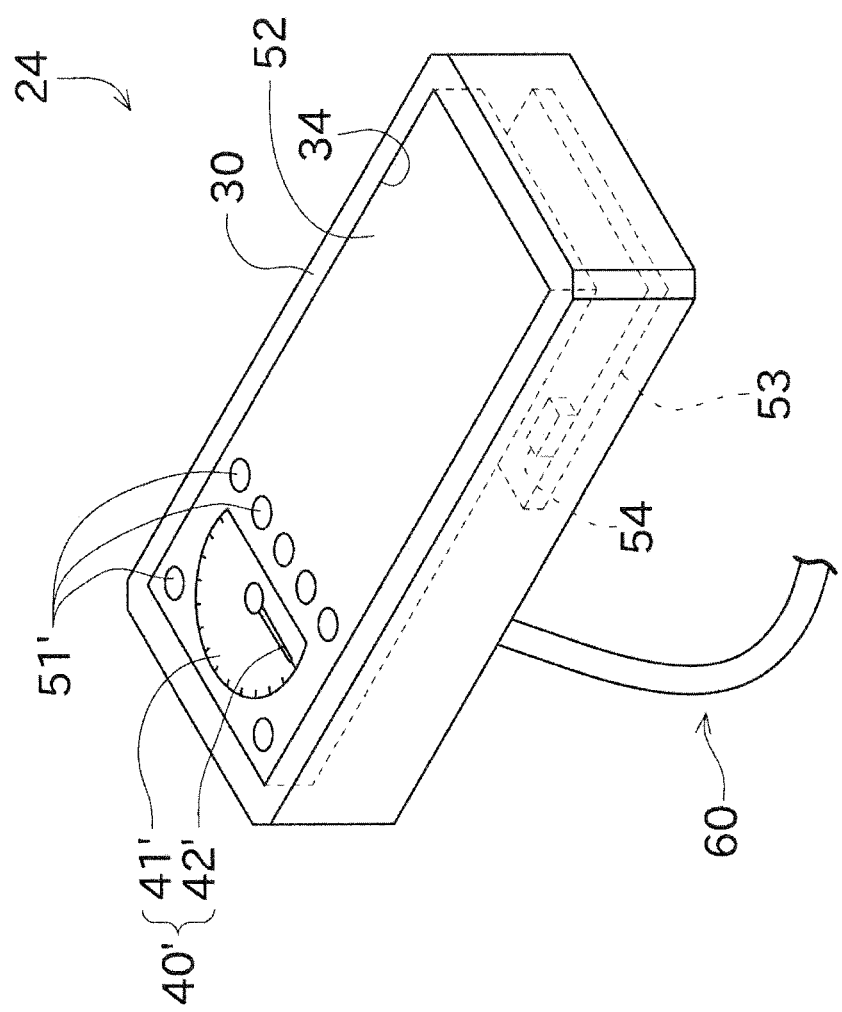
FIG. 8 shows a perspective view of the meter device of another embodiment.

As shown in FIG. 8, the meter device 24 of another embodiment includes a housing 30, the liquid crystal display unit (electronic display unit) 52, a meter circuit board (display control unit) 53, a communication unit 54, and a meter harness (power supply unit) 60.

The housing 30 is a member for forming an outer surface of the meter device 24. The housing 30 is exposed to the outside of the motorcycle 1 so that the driver can visually recognize a notification displayed on the meter device 24. The meter device 24 has an internal space for accommodating each of members that configures the meter device 24.

The housing 30 is a rectangular portion in the front view. A rectangular opening 34 that opens in a rectangle is formed on a surface of the housing 30. The liquid crystal display unit 52 is arranged in the rectangular opening 34. The liquid crystal display unit 52 includes a dot matrix electronic display device (such as a liquid crystal display, a plasma display, an organic EL display).

In the left portion of the liquid crystal display unit 52 an image of an analog display 40' displays an engine speed. A dial 41' and an electronic pointer 42' are displayed. The dial 41' and the electronic pointer 42' are configured to provide the same impression as dial plate 41 and pointer 42 described with regard to FIG. 3.

Notification spots 51' having a circular shape are displayed on liquid crystal display unit 52. Each of the notification spots 51' notifies various situations concerning the motorcycle 1 in a similar way as the notification lamps 51 described with regard to the previous Figures.

The right portion of liquid crystal display unit 52 displays the vehicle information concerning the motorcycle 1 (to be specific, the driving speed, the mileage, the remaining amount of fuel and the like). The liquid crystal display unit 52 can display the information received from a communication terminal of the driver or the like as described with regard to previous Figures. The liquid crystal display unit 52 is not limited to a dot matrix type display. A segment type display may be used for the liquid crystal display unit 52.

As described above, since the liquid crystal display unit 52 is included in a part of the housing 30, it is exposed to the outside.

The meter circuit board 53 is arranged at the internal space of the housing 30. The meter circuit board 53 performs the various control concerning the meter device 24. For example, as shown in FIG. 4, the contents detected by any type of sensor 72 arranged in the motorcycle 1 are inputted to the meter circuit board 53 via an ECU 73. The sensor 72 may output the detection result directly to the meter circuit board 53. Based on the detection result of the sensor, the meter circuit board 53 enables the pointer 42' to be displayed in a rotating manner on the liquid crystal display unit 52 by transmitting the image data to the liquid crystal display unit 52, or the communication unit 54 to perform communication.

Although the communication unit 54 is arranged at the internal space of the housing 30, specifically, on the meter circuit board 53, the communication unit 54 may be arranged on another position other than the meter circuit board 53 as long as the communication unit 54 is arranged within the internal space of the housing 30. The communication unit 54 can perform the wireless communication with a communication terminal 100 of the driver or the like. To be specific, the communication unit 54 transmits the predetermined information (for example, the turbocharging pressure, the remaining amount of fuel, the mileage, information of the vehicle posture and the like) in the wireless communication, and receives the predetermined information from the communication terminal 100. The predetermined information received from the communication terminal 100 includes the setting change, the navigation information, and the information concerning the communication status of the communication terminal 100 (specifically, such as a mail reception state, a telephone call state, a state of applications pre-installed on the communication terminal 100 and the like). Since the motorcycle 1 and the driver or the like are positioned in a relatively close distance, in the communication between the motorcycle 1 and the communication terminal 100, the communication standard having the communication distance of 10 m or less, approximately 10 m, or 100 m or less (near field communication) can be used. Bluetooth (registered trademark) can be used as an example for the communication standard. It is assumed that the communication between the meter device 24 and the communication terminal 100 is performed outdoors. Therefore, it is preferable to use the communication standard which can perform the communication after the meter device 24 and the communication terminal 100 are registered each other and completed the authentication process.

The meter harness 60 supplies the power (power supply) for driving each of parts in the meter device 24. The meter harness 60 is connected to the battery 71 directly or via other electric wires or the like. The meter harness 60 includes a conductor for supplying the power with each of parts in the meter device 24. A power conduction path is common since the conductor has a single system at the outside of the housing 30. The meter circuit board 53 is configured to be partly exposed to the outside from the housing 30. A board side connector is arranged at this exposed portion. The meter harness 60 (to be specific, a harness side connector in an end portion of the meter harness 60) is connected to the board side connector. A protector (such as a cover for covering the connectors) for preventing the entry of water or the like is provided at a connecting position of the meter side connector and the harness side connector. The meter harness 60 branches into a plurality of systems within the housing 30, and supplies the power with the liquid crystal display unit 52, the meter circuit board 53, and the communication unit 54 individually. As such, the power conduction path is branched within the housing 30. The meter harness 60 may be configured to bundle a plurality of electrical wires. In this case, the plurality of electrical wires is bundled at the outside of the housing 30, and thereby the power conduction path is common. The plurality of electrical wires is branched within the housing 30, and thereby the power conduction path is branched.

In this embodiment the elements and features described with regard to FIGS. 4 to 7 are adapted accordingly. In a further embodiment (not shown) notification lamps are arranged outside the liquid crystal display unit 52, while dial 41' and pointer 42' are displayed on the liquid crystal display unit 52.

The above-described positional relationship of the meter device 24 are merely illustrative examples, the positional relationship different from the above may be adoptable. For example, the meter device 24 and the upper bracket 18 may be positioned so as to overlap with each other when viewed from the upper side in the vertical direction. The meter device 24 may be arranged above the fuel tank 22. The meter device 24 may be mounted on the fuel tank 22 (on a surface of the fuel tank 22).

The present invention may be applicable to other saddle type vehicles, not limited to the motorcycle. Especially in the saddle type vehicle, the meter device is exposed to the outside. Therefore, the effect of which a connecting portion of the power supply unit such as a harness is easily protected from water can be effectively exerted on the other saddle type vehicles. The examples of the saddle type vehicles may include all-terrain vehicles (ATV, All Terrain Vehicle) for mainly off-road traveling, personal water crafts (PWC, Personal Water Craft) and the like.

DESCRIPTION OF THE REFERENCE NUMERALS

1 motorcycle (saddle type vehicle)
24 meter device
40 analog display unit
51 notification lamps
52 liquid crystal display unit (electronic display unit)
53 meter circuit board (display control unit)
54 communication unit
60 meter harness (power supply unit)

The invention claimed is:

1. A saddle vehicle including a vehicle meter device, the vehicle meter device comprising:
an analog display unit exposed to the outside of the saddle vehicle, the analog display unit having a dial plate and a pointer;
an electronic display unit exposed to the outside of the saddle vehicle, the electronic display unit including a display for displaying vehicle information;
a display control unit electronically controlling displayed contents of the electronic display unit;
a communication unit performing a wireless communication with an external communication terminal;
a housing in which the display control unit and the communication unit are arranged within the housing, the housing including a part of the analog display unit and a part of the electronic display unit; and
a power supply unit having a common power conduction path to the housing and supplying power to at least the analog display unit, the electronic display unit, the display control unit, and the communication unit,
wherein the power conduction path comprises a single system at the outside of the housing and is branched within the housing.

2. The saddle vehicle according to claim 1 comprising:
a driver's seat, wherein the position of the vehicle meter device is above the position of the driver's seat in the vertical direction.

3. The saddle vehicle according to claim 1 comprising:
a steering handle including two grips for the driver's operation, wherein at least one of the vehicle meter device in the vertical direction is positioned within the two grips or the vehicle meter device in the front-back direction is positioned forward of the two grips.

4. The saddle vehicle according to claim 1 comprising:
an upper bracket mounted via a steering shaft which is rotatably supported to a frame, wherein at least one of the vehicle meter device in the front-back direction is positioned forward of the upper bracket in the front-back direction or the vehicle meter device in the vertical direction is positioned above the upper bracket in the vertical direction.

5. The saddle vehicle according to claim 4 comprising:
a fuel tank arranged rearward of the upper bracket, wherein an upper end of the fuel tank is positioned above an upper end of the upper bracket, the vehicle meter device in the front-back direction is positioned forward of the upper bracket in the front-back direction, the vehicle meter device in the vertical direction is positioned above the upper bracket in the vertical direction.

6. The saddle vehicle according to claim 1, wherein the vehicle meter device is mounted to rotatably support a steering handle.

7. The saddle vehicle according to claim 1, wherein the display control unit is configured to be partly exposed to the outside from the housing, wherein a board side connector is arranged at this exposed portion, and wherein a branch of the power supply unit is connected to the board side connector.

8. A saddle vehicle including a vehicle meter device, the vehicle meter device comprising:
an electronic display unit exposed to the outside of the saddle vehicle, the electronic display unit including a display for displaying vehicle information;
a display control unit electronically controlling displayed contents of the electronic display unit;
a communication unit that performs a wireless communication with an external communication terminal;

a housing in which the display control unit and the communication unit are arranged within the housing, the housing including a part of the electronic display unit; and a power supply unit having a common power conduction path to the housing and supplying power to at least the electronic display unit, the display control unit, and the communication unit, wherein the power conduction path comprises a single system at the outside of the housing and is branched within the housing.

9. The saddle vehicle according to claim 8 comprising:
a driver's seat, wherein the position of the vehicle meter device is above the position of the driver's seat in the vertical direction.

10. The saddle vehicle according to claim 8 comprising:
a steering handle including two grips for the driver's operation, wherein at least one of the vehicle meter device in the vertical direction is positioned within the two grips or the vehicle meter device in the front-back direction is positioned forward of the two grips.

11. The saddle vehicle according to claim 8 comprising:
an upper bracket mounted via a steering shaft which is rotatably supported to a frame, wherein at least one of the vehicle meter device in the front-back direction is positioned forward of the upper bracket in the front-back direction or the vehicle meter device in the vertical direction is positioned above the upper bracket in the vertical direction.

12. The saddle vehicle according to claim 11 comprising:
a fuel tank arranged rearward of the upper bracket, wherein an upper end of the fuel tank is positioned above an upper end of the upper bracket, the vehicle meter device in the front-back direction is positioned forward of the upper bracket in the front-back direction, the vehicle meter device in the vertical direction is positioned above the upper bracket in the vertical direction.

13. The saddle vehicle according to claim 8, wherein the vehicle meter device is mounted to rotatably support a steering handle.

14. The saddle vehicle according to claim 8, wherein the display control unit is configured to be partly exposed to the outside from the housing, wherein a board side connector is arranged at this exposed portion, and wherein a branch of the power supply unit is connected to the board side connector.

* * * * *